US008469135B2

(12) United States Patent
Kaschner

(10) Patent No.: US 8,469,135 B2
(45) Date of Patent: Jun. 25, 2013

(54) ALCOHOL IMMOBILIZER HAVING AN EMERGENCY DRIVE OPTION

(75) Inventor: Axel Kaschner, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 12/678,447

(22) PCT Filed: Sep. 11, 2008

(86) PCT No.: PCT/EP2008/062052
§ 371 (c)(1),
(2), (4) Date: Jun. 21, 2010

(87) PCT Pub. No.: WO2009/047074
PCT Pub. Date: Apr. 16, 2009

(65) Prior Publication Data
US 2010/0312431 A1    Dec. 9, 2010

(30) Foreign Application Priority Data
Oct. 5, 2007  (DE) .......................... 10 2007 047 709

(51) Int. Cl.
*B60K 28/00*    (2006.01)
(52) U.S. Cl.
USPC .................................. 180/272; 701/36; 701/1
(58) Field of Classification Search
USPC .................... 180/272; 340/5.3, 426.1, 426.12, 340/426.13, 426.14, 426.15, 426.16, 426.24; 701/1, 33, 35
See application file for complete search history.

(56) References Cited

U.S. PATENT DOCUMENTS

| 5,020,628 | A * | 6/1991 | Bigliardi et al. ............. 180/272 |
| 7,343,244 | B2 * | 3/2008 | Flick ............................. 701/484 |
| 2003/0120139 | A1 | 6/2003 | Duval et al. |
| 2004/0138823 | A1 * | 7/2004 | Gollar ............................. 702/19 |
| 2007/0200663 | A1 * | 8/2007 | White et al. ................. 340/5.31 |

FOREIGN PATENT DOCUMENTS
KR    2001/011208    2/2001

* cited by examiner

*Primary Examiner* — John Q Nguyen
*Assistant Examiner* — Jordan S Fei
(74) *Attorney, Agent, or Firm* — Kenyon & Kenyon LLP

(57) ABSTRACT

A device for preventing the start-up or initial operation of a vehicle, in particular of a motor vehicle, by a vehicle driver who is under the influence of alcohol, as well as a vehicle equipped with such a device. The device includes a device for determining the alcohol content in the breath, blood, tissue, sweat of the skin, or in the interstitial tissue fluid of the vehicle driver, as well as an immobilizer which prevents the start-up or the initial operation of the vehicle when the alcohol content in the vehicle driver's breath, blood, tissue, sweat of the skin, or interstitial tissue fluid, that is ascertained by the device, exceeds a specified threshold value. Means are provided for bypassing or disabling the immobilizer.

8 Claims, 2 Drawing Sheets

ALCOHOL IMMOBILIZER HAVING AN EMERGENCY DRIVE OPTION

FIELD OF THE INVENTION

The present invention relates to a device for preventing the start-up or initial operation of a vehicle by a vehicle driver who is under the influence of alcohol, as well as to a vehicle equipped with such a device, in particular a motor vehicle.

BACKGROUND INFORMATION

In Germany alone, more than 20,000 traffic accidents occur every year involving people who under the influence of alcohol. Since these accidents, which are attributable to alcohol, result in death for more than 600 people and serious injury for more than 8,000 people, efforts are underway in recent years to find ways to prevent these accidents.

One of the possibilities proposed provides for using a device of the type mentioned at the outset, which is frequently also referred to as an alcohol interlock system. This device is installed in the vehicle and prevents intoxicated vehicle drivers from starting the vehicle or putting it into operation if the alcohol level of the vehicle driver exceeds a specified threshold value.

Most alcohol interlock systems in use today are based on measuring the alcohol content in the air exhaled by the vehicle driver and, for that purpose, include a measuring device for measuring the alcohol in the breath of the vehicle driver, a display device connected to the measuring device or integrated therein which indicates whether or not the measured alcohol content exceeds the specified threshold value, a control unit that communicates with the measuring device, as well as an immobilizer which, for the most part, is integrated in an ignition and starter circuit. When the vehicle driver turns on the ignition of the motor vehicle, he/she is prompted by a corresponding display on the display device to provide a breath sample to determine the alcohol content in the breath. If the alcohol content in the breath sample exceeds the specified threshold value, the power supply to the starter is blocked to prevent the motor vehicle from being driven by a driver who is under the influence of alcohol. Once a preset delay of about 10 minutes has elapsed, another breath sample can generally be given, whose alcohol content is again determined by the measuring device. The system then decides whether the vehicle should continue to be blocked by the control unit and the immobilizer or whether a start should be enabled.

However, besides measuring the alcohol in a person's breath, it is also possible, however, to measure the alcohol content in the blood, in the tissue or in the interstitial tissue fluid of the vehicle driver, for example, using infrared-based spectroscopy, or to analyze the alcohol content in the sweat of the vehicle driver's skin with the aid of chemical sensors, or to evaluate parameters that are physiologically dependent on the blood alcohol content, such as eye and head movements, as well as the heart rate of the vehicle driver, in order to ascertain a possible intoxication of the vehicle driver.

One of these options can be inferred from publications that are cited in U.S. Patent Publication No. 2003/0120139 in connection with a device for preventing start-up of a machine by an operator who is under the influence of alcohol or a different drug.

However, regardless of the technique used to determine the degree of intoxication of the vehicle driver, all of the known systems have the disadvantage that the vehicle can no longer be started for a certain minimum time period following an activation of the immobilizer, on the one hand, due to the preset delay and, on the other hand, because a certain amount of time is required for repeating the determination of the alcohol content, as is already required for the first determination of the same, for example, approximately one minute, when measuring devices are employed for measuring the alcohol content in the breath, using fuel cells at low ambient temperatures.

From Korean Patent Application No. KR 2001/011208, it is already known to activate a warning device of a vehicle when the vehicle is started or driven by an intoxicated vehicle driver. The device used for that purpose includes a sensor for ascertaining the alcohol content in the breath of the vehicle driver.

Against this background, an object of the present invention is to improve a device of the type mentioned at the outset in a way that allows the vehicle to be quickly started, at least in cases of emergency or in dangerous situations, in spite of a previously activated immobilizer.

SUMMARY OF THE INVENTION

This objective is achieved in accordance with the present invention by means for bypassing or disabling the immobilizer that are capable of deactivating the same.

To prevent intoxicated vehicle drivers from using these means improperly to start the vehicle or put it into operation while bypassing or disabling the immobilizer that had been activated as a consequence of the intoxication, to the extent possible, it is necessary that such an improper use of the means for bypassing or disabling the immobilizer be ruled out or at least registered.

In accordance with one first advantageous embodiment of the present invention, the latter may be accomplished by providing the device with a memory for storing each instance of bypassing or disabling of the immobilizer using the means. This allows a control of the memory to be performed at certain time intervals, particularly in cases of vehicles of drivers who have had alcohol offences and for whom the courts or the police have mandated the use of an alcohol interlock system in order to ascertain a more than one time bypassing or disabling of the immobilizer, indicating an improper use.

Alternatively or additionally, the device may also include means for transmitting a bypass or disable signal, which, in response to each bypassing or disabling of the immobilizer, transmits a signal to a reporting point, for example, using a transmitter that is connected to the device or integrated in the same, whose signal may be transmitted via a cellular radio system or some other communications network, such as a car-to-car communications network, to the nearest police station or to the nearest police vehicle to check the incident.

Another alternative or additional measure provides for limiting the maximum driving speed of the vehicle to a speed value, for example, to 50 km/h, each time the immobilizer is bypassed or disabled, until the immobilizer is once again released, for cases of alcohol-related vehicle accidents where the persons involved have generally not yet suffered fatal or serious injuries, but where it is essential that the system allow the vehicle to be removed from its location quickly enough or permit a patient requiring emergency care to be transported quickly enough to a doctor or hospital.

In addition, the vehicle could also include means for automatically activating a warning device, for example, the hazard warning system of the vehicle, each time the immobilizer is bypassed or disabled, in order, in this manner, to alert other road users to a dangerous situation, or to warn them about a potential danger posed by an intoxicated vehicle driver.

Last but not least, it would also be conceivable, however, to design the means for bypassing or disabling the immobilizer in such a way that, in response to a call to a reporting point, for example, a police station, the immobilizer is able to be deactivated either from the reporting point itself by a coded radio signal, or by the vehicle driver, respectively a third party, using a code communicated by telephone from the reporting point. In this case, any later misuse may be avoided by changing the code following each bypassing or disabling of the immobilizer.

In principle, the means for bypassing or disabling the immobilizer may be activated in different ways, for example, by an emergency button or an emergency switch, by invoking and confirming a corresponding operator instruction in an operating menu of the device, advantageously on a touchscreen of the display device, or by repeatedly turning the ignition key.

DETAILED DESCRIPTION

Figure 1:
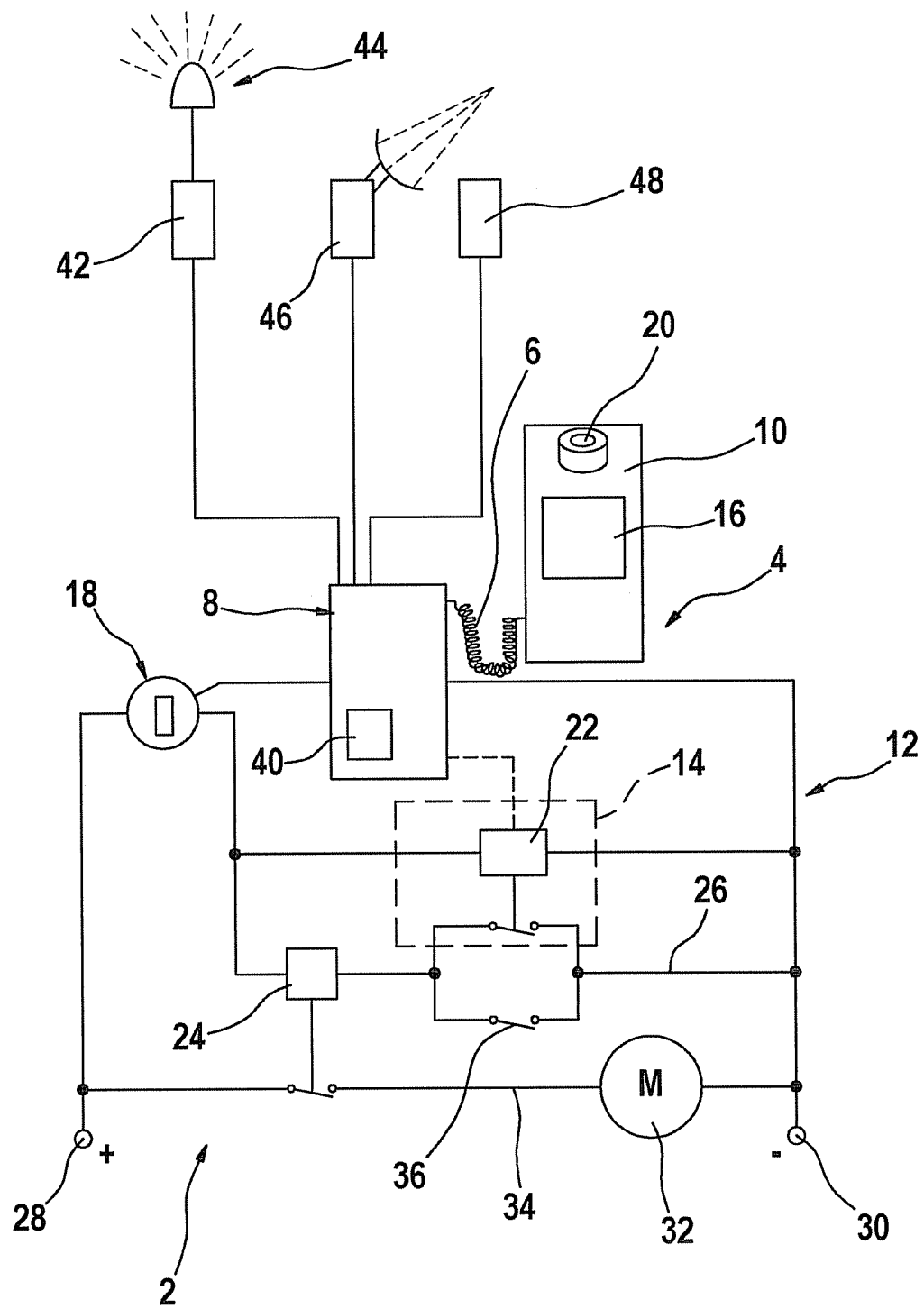
FIG. 1 shows a schematic view of an alcohol interlock device of a motor vehicle, including means for bypassing or disabling an immobilizer.

Alcohol interlock devices 4 schematically illustrated in the drawing, which are integrated in an ignition and starter system 2 of a motor vehicle, are used for preventing a start-up or initial operation of the motor vehicle by an intoxicated vehicle driver when the alcohol content in the breath of the vehicle driver exceeds a specified threshold value. For example, the threshold value may be approximately 0.25 mg of alcohol per liter of exhaled air, which corresponds to a blood alcohol concentration of 0.5 per mille, at which level, operation of a motor vehicle is no longer permissible.

To measure the alcohol content in the breath of the vehicle driver, alcohol interlock devices 4 include a handheld measuring device 10, which is connected by a cable 6 or, alternatively, also wirelessly to a control unit 8, while, to prevent the start-up or initial operation of the motor vehicle, alcohol interlock devices 4 feature an immobilizer 14 that is driven by control unit 8 and, in the same way as control unit 8, is integrated in an ignition and starter circuit 12 of the motor vehicle.

In addition, alcohol interlock devices 4 encompass a display 16 that is mounted on handheld measuring device 10. A prompt appears on this display 16 requesting that the vehicle driver provide a breath sample in order to measure the alcohol content in the breath when an ignition key is inserted into ignition lock 18 of the vehicle and, by turning the ignition key, the ignition of the motor vehicle, as well as control unit 8 integrated in ignition and starter circuit 12 are switched on. The breath sample is given in that the vehicle driver blows into a mouthpiece 20 that is likewise configured on handheld measuring device 10. Provided within handheld measuring device 10 are suitable measuring devices (not shown), which may be used to determine the alcohol concentrations in the breath blown into mouthpiece 20, as, for example, in the case of the measuring devices indicated in U.S. Patent Publication No. 2003/0120139 mentioned at the outset, respectively in the printed publications cited therein. Following the measurement, display 16 indicates whether the alcohol content in the breath blown by the vehicle driver into mouthpiece 20 exceeds the threshold value mentioned above or is below the same.

In the first mentioned case, immobilizer 14 is activated by control unit 8 in order to prevent a start-up of the vehicle. To this end, immobilizer 14 includes an interruption relay 22 driven by control unit 8 in a current circuit 26 leading to a starter relay 24 between a positive terminal 28 and a negative terminal 30 of a vehicle battery. Upon activation of immobilizer 14 by control unit 8, interruption relay 22 is held in the open state, thereby preventing an actuation of starter relay 24 and thus the closing of a starter current circuit 34 containing starter 32 upon turning of the ignition key into a start position.

In the last mentioned case, i.e., in the case the threshold value is fallen short of, interruption relay 22 is closed by control unit 8, whereupon starter relay 24 closes starter current circuit 34 and enables the power supply to starter 32, as soon as the ignition key in ignition lock 18 is turned into the start position.

A previously activated immobilizer 14 may, in fact, be deactivated by repeating a measurement of the alcohol content in the breath of the vehicle driver to obtain the result that the specified threshold value is fallen short of. However, since, on the one hand, such a measurement is not possible until after a specified delay of about 10 minutes, which has been preset in control unit 8, following activation of immobilizer 14 and, on the other hand, the measurement itself requires a certain amount of time, it is not possible in cases of emergency or in dangerous situations to quickly remove the vehicle from its location, for example, in order to quickly locate a doctor or a hospital or to respond defensively to a dangerous situation, for example, when the vehicle is blocking an approach road for the fire department.

To permit start-up of the vehicle in such cases in spite of activated immobilizer 14, alcohol interlock device 4 illustrated in FIG. 1 features a manually actuatable emergency switch 16 configured in parallel to interruption relay 22 in current circuit 26. By actuating this emergency switch 36, current circuit 26 leading to starter relay 24 may be closed while bypassing interruption relay 22 and thus immobilizer 14, whereupon starter 32 is supplied with current in response to turning of the ignition key into the start position.

Figure 2:
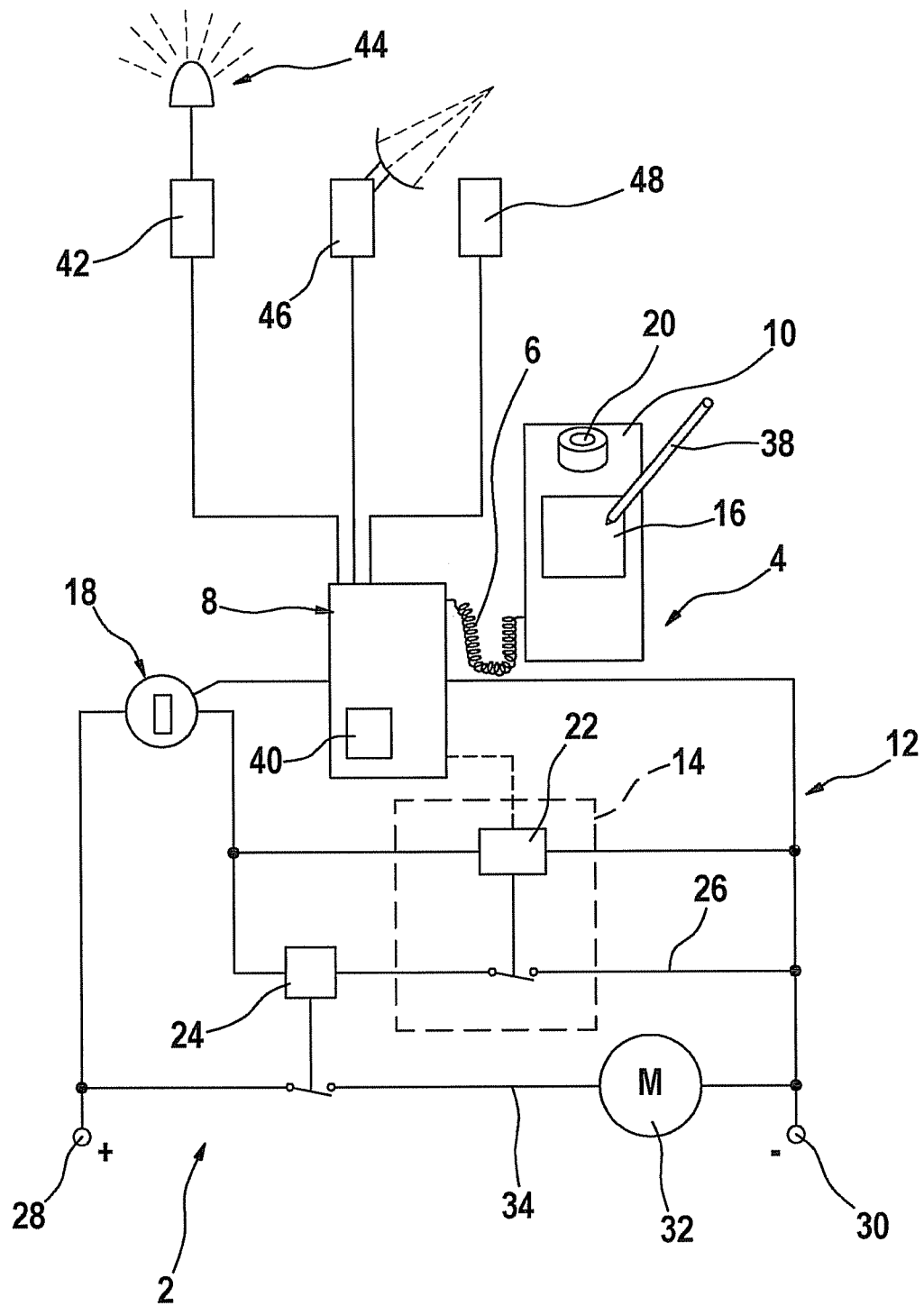
FIG. 2 shows a schematic view of a similar alcohol interlock device, however, including other means for bypassing or disabling an immobilizer.

Alcohol interlock device 4 illustrated in FIG. 2 has a display 16 designed as a touchscreen on which, besides the prompt requesting a breath sample, respectively, the exceedance or falling short of the threshold value by the alcohol content in the exhaled air blown into mouthpiece 20, an operating menu may also be displayed into which, for example, operator instructions may also be input, for example, using a stylus 38. In the case of this device, in place of emergency switch 36, a corresponding operating instruction may be provided in the operating menu, which may be used to instruct control unit 8 to deactivate immobilizer 14 by immediately closing interruption relay 22.

To prevent an improper use of emergency switch 36 or of the operating instruction to deactivate immobilizer 14, control unit 8 includes a memory 40 which stores each actuation of emergency switch 36, respectively each operating instruction for deactivating immobilizer 14, thereby allowing memory 40 to be read out at certain time intervals, to ascertain whether an improper use has possibly occurred based on the stored number of instances of bypassing of immobilizer 14.

In addition, control unit 8 may be connected to a flasher relay 42 of a hazard warning system 44 of the vehicle, in order to continuously activate hazard warning system 44 following each bypassing of immobilizer 14 until the engine of the vehicle is once again shut off in response to turning of the ignition key in ignition lock 18. Alternatively or additionally, a transmitter 46, which is connected to control unit 8 or, as the case may be, is also integrated therein, which transmits a message via a cellular radio system, a car-to-car network or a different communications network to a police station, police vehicle or to a different reporting point located near the vehicle, that, in response thereto, may perform or initiate a check of the vehicle driver or of the vehicle in order to immobilize the vehicle in the case of an improper deactivation of immobilizer 14.

Moreover, control unit 8 may also communicate with a control 48 of the motor vehicle in order to limit its maximum driving speed to a value of less than 50 km/h until the engine is shut off.

What is claimed is:

1. A device for preventing a start-up or initial operation of a motor vehicle, by a vehicle driver who is under the influence of alcohol, comprising:
    a device for determining an alcohol content in the breath, blood, tissue, sweat of the skin, or in the interstitial tissue fluid of the vehicle driver;
    an immobilizer for preventing the start-up or initial operation of the vehicle when the alcohol content determined by the device exceeds a specified threshold value; and
    means for bypassing or disabling the immobilizer by the driver to allow operation of the vehicle when the alcohol content determined by the device exceeds the specified threshold value,
    wherein the means includes a repeated actuation of an ignition key of the vehicle.

2. The device according to claim 1, further comprising a memory for storing each bypassing or disabling of the immobilizer.

3. The device according to claim 1, further comprising means for transmitting a signal to a reporting point in response to each bypassing or disabling of the immobilizer.

4. The device according to claim 3, wherein the means for transmitting includes a cellular radio transmitter.

5. The device according to claim 3, wherein the means for transmitting includes a car-to-car communications device.

6. The device according to claim 3, wherein the reporting point is a police station or a police vehicle near the vehicle.

7. The device according to claim 1, further comprising means for limiting a maximum driving speed of the vehicle each time the immobilizer is bypassed or disabled through activation of the means for bypassing or disabling.

8. The device according to claim 1, further comprising means for automatically activating a warning device on the vehicle each time the immobilizer is bypassed or disabled through activation of the means for bypassing or disabling.

* * * * *

UNITED STATES PATENT AND TRADEMARK OFFICE
CERTIFICATE OF CORRECTION

PATENT NO. : 8,469,135 B2  Page 1 of 1
APPLICATION NO. : 12/678447
DATED : June 25, 2013
INVENTOR(S) : Axel Kaschner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 242 days.

Signed and Sealed this
Eighth Day of September, 2015

Michelle K. Lee
*Director of the United States Patent and Trademark Office*